US012342147B2

(12) United States Patent
Imahama et al.

(10) Patent No.: US 12,342,147 B2
(45) Date of Patent: Jun. 24, 2025

(54) AUDIO DEVICE, AUDIO SYSTEM, AND COMPUTER-READABLE PROGRAM

(71) Applicant: D&M Holdings, Inc., Kanagawa (JP)

(72) Inventors: Yoshiharu Imahama, Kanagawa (JP); Shunichi Tani, Kanagawa (JP); Yusuke Higashimoto, Kanagawa (JP)

(73) Assignee: D&M HOLDINGS, INC., Kawasaki (JP)

( * ) Notice: Subject to any disclaimer, the term of this patent is extended or adjusted under 35 U.S.C. 154(b) by 90 days.

(21) Appl. No.: 17/608,179

(22) PCT Filed: Mar. 30, 2020

(86) PCT No.: PCT/JP2020/014525
§ 371 (c)(1),
(2) Date: Nov. 2, 2021

(87) PCT Pub. No.: WO2020/225997
PCT Pub. Date: Nov. 12, 2020

(65) Prior Publication Data

US 2022/0225046 A1 Jul. 14, 2022

(30) Foreign Application Priority Data

May 8, 2019 (JP) ................................ 2019-088684

(51) Int. Cl.
*H04S 5/00* (2006.01)
*H04R 3/12* (2006.01)

(52) U.S. Cl.
CPC ............... *H04S 5/005* (2013.01); *H04R 3/12* (2013.01); *H04R 2420/03* (2013.01)

(58) Field of Classification Search
CPC ........ H04S 5/005; H04R 3/12; H04R 2420/03
See application file for complete search history.

(56) References Cited

U.S. PATENT DOCUMENTS

2001/0008531 A1 7/2001 Lanigan et al.
2002/0140859 A1* 10/2002 Kariatsumari ... H04N 21/43072 375/E7.271

(Continued)

FOREIGN PATENT DOCUMENTS

EP 3059980 B1 11/2017
JP 2002-367290 12/2002

(Continued)

*Primary Examiner* — Daniel R Sellers
(74) *Attorney, Agent, or Firm* — Nieves IP Law Group, LLC; Peter A. Nieves

(57) ABSTRACT

To enable listening with a desired number of channels at a lower cost and without wasting resources. According to the present invention, a multi-channel digital audio signal is processed through the cooperation of a plurality of AV amplifier devices. One AV amplifier device 1 serves as a master, and distributes the audio channels to be processed to the other AV amplifier devices 1 including the own device 1, and determines, on the basis of the signal processing time of each AV amplifier device 1, the output delay time of each AV amplifier device 1 such that the output timings of the analog audio signals of all AV amplifier devices 1 match each other. Then, the AV amplifier device 1 decodes the input digital audio signal into an analog audio signal for an audio channel distributed to the own device 1 by the master, and delays and outputs the decoded analog audio signal by the output delay time of the own device 1 determined by the master.

20 Claims, 8 Drawing Sheets

(56) References Cited

U.S. PATENT DOCUMENTS

| | | | | |
|---|---|---|---|---|
| 2004/0249490 | A1 | 12/2004 | Sakai | |
| 2004/0258259 | A1 | 12/2004 | Koyama | |
| 2005/0044570 | A1 | 2/2005 | Poslinski | |
| 2005/0190928 | A1* | 9/2005 | Noto | H04R 3/12 381/2 |
| 2007/0038999 | A1* | 2/2007 | Millington | G06F 3/0482 718/100 |
| 2007/0087686 | A1 | 4/2007 | Holm et al. | |
| 2008/0045140 | A1* | 2/2008 | Korhonen | H04M 1/72412 455/3.06 |
| 2008/0077261 | A1* | 3/2008 | Baudino | H04M 1/72412 700/94 |
| 2009/0290064 | A1 | 11/2009 | Matsumoto et al. | |
| 2010/0238107 | A1 | 9/2010 | Ohki et al. | |
| 2011/0142245 | A1* | 6/2011 | Toba | G11B 20/10527 381/22 |
| 2011/0187927 | A1 | 8/2011 | Simon | |
| 2011/0310308 | A1 | 12/2011 | Asayama et al. | |
| 2014/0139738 | A1 | 5/2014 | Mehta et al. | |
| 2016/0196106 | A1 | 7/2016 | Hammer et al. | |
| 2016/0212534 | A1* | 7/2016 | Le Nerriec | H04R 3/12 |
| 2017/0115740 | A1 | 4/2017 | Kim et al. | |
| 2017/0257722 | A1 | 9/2017 | Kerdranvat et al. | |
| 2017/0374484 | A1* | 12/2017 | Lando | G10L 19/008 |
| 2018/0077491 | A1 | 3/2018 | Butler et al. | |
| 2018/0184223 | A1 | 6/2018 | Lee et al. | |
| 2019/0075398 | A1 | 3/2019 | Shirai et al. | |

FOREIGN PATENT DOCUMENTS

| | | | |
|---|---|---|---|
| JP | 2005-217559 | | 8/2005 |
| JP | 2007151173 | A | 6/2007 |
| JP | 2009-135750 | | 6/2009 |
| JP | 2010004520 | | 1/2010 |
| JP | 2010-68536 | | 3/2010 |
| JP | 2010-166534 | | 7/2010 |
| JP | 2017103711 | A | 6/2017 |
| WO | 2013146602 | | 10/2013 |

* cited by examiner

AUDIO DEVICE, AUDIO SYSTEM, AND COMPUTER-READABLE PROGRAM

CROSS-REFERENCE TO RELATED APPLICATIONS

This application is the national stage of International Application No. PCT/JP2020/014525, filed Mar. 30, 2020, entitled AUDIO DEVICE, AUDIO SYSTEM, AND COMPUTER-READABLE PROGRAM which claims the benefit of Japanese Patent Application serial number 2019-088684, filed May 8, 2019, both of which are incorporated by reference herein in their entirety.

TECHNICAL FIELD

The present invention relates to a technology of processing a multi-channel digital audio signal.

BACKGROUND ART

Hitherto, an audio device for processing a multi-channel digital audio signal has been known. For example, an audio reproduction device described in Patent Literature 1 decodes a 5.1 channel digital audio signal into analog audio signals for a front left channel, a front right channel, a center channel, a surround left channel, a surround right channel, and a subwoofer channel, amplifies the analog audio signals, and outputs each of the analog audio signals from a corresponding output terminal.

CITATION LIST

Patent Literature

[PTL 1] JP 2002-367290 A

SUMMARY OF INVENTION

Technical Problem

In recent years, a 7.1 channel digital audio signal in which a surround back left channel and a surround back right channel are added to the 5.1 channels described above is becoming a main stream. For home use, Auro-3D (trademark) adaptable to up to 13.1 channels, Dolby Atoms (trademark) for Home adaptable to up to 24.1.10 channels, and others have been proposed, and a channel count of audio channels is on an ever-increasing trend.

Considering this situation, it is likely that a new digital audio signal supporting a channel count higher than an adaptable channel count of an audio device owned by a user comes to be in use before long. In order to listen to this new digital audio signal at a channel count higher than the adaptable channel count of the audio device owned by the user, the user is required to purchase a new audio device adaptable to this channel count to replace the owned audio device.

However, an audio device with a high adaptable channel count is generally expensive. It is therefore costly to purchase a new audio device every time a digital audio signal is to be listened to at a channel count higher than the adaptable channel count of the owned audio device. In addition, the owned audio device that is no longer used is a waste of resources.

The present invention has been made in view of the circumstances described above, and is to provide a technology with which listening at a desired channel count is accomplished at a lower cost without wasting resources.

Solution to Problem

In order to solve the problems described above, the present invention involves processing of a multi-channel digital audio signal through cooperation of a plurality of audio devices. One of the plurality of audio devices serves as a master to distribute audio channels to be processed among those audio devices including an own device, and determine, based on a signal processing time of each of the audio devices, an output delay time of each of the audio devices so that timing of outputting an analog audio signal matches for all of the audio devices. Each of the audio devices decodes the multi-channel digital audio signal input thereto into an analog audio signal for the audio channel distributed by the master to the own device, and outputs the analog audio signal created by the decoding with a delay of the output delay time determined by the master for the own device.

For example, according to one embodiment of the present invention, there is provided an audio device for processing a multi-channel digital audio signal through cooperation with another audio device, the audio device including: master setting means configured to set, when an own device satisfies a predetermined condition, the own device as a sole master selected from among a plurality of audio devices including the own device and the another audio device; performance information acquisition means configured to acquire, when the own device is set as the master by the master setting means, from the another audio device, performance information including an adaptable channel count and a signal processing time; channel distribution means configured to distribute, when the own device is set as the master by the master setting means, an audio channel to be processed to each of the plurality of audio devices, based on an adaptable channel count of the own device and the adaptable channel count that is included in the performance information acquired from the another audio device by the performance information acquisition means; output delay time determination means configured to determine, when the own device is set as the master by the master setting means, an output delay time for each of the plurality of audio devices so that timing of outputting an analog audio signal matches in the plurality of audio devices, based on the signal processing time in the own device and the signal processing time that is included in the performance information acquired from the another audio device by the performance information acquisition means; settings information notification means configured to notify to the another audio device, when the own device is set as the master by the master setting means, settings information including the audio channel to be processed that is distributed to the another audio device by the channel distribution means and the output delay time determined for the another audio device by the output delay time determination means; audio signal processing means configured to decode the multi-channel digital audio signal input thereto into the analog audio signal for the audio channel distributed to the own device by the channel distribution means when the own device is set as the master by the master setting means, and to decode the multi-channel digital audio signal input thereto into an analog audio signal for the audio channel that is included in the settings information notified from the master when the own device is not set as the master; and audio output delay means configured to output the analog audio signal created through decoding by the audio signal processing means with a delay of the output delay time determined for the own device by the output delay time determination means when the own device is set as the master by the master setting means, and to output the analog audio signal created through decoding by the audio signal processing means with a delay of the output delay time that is included in the settings information notified from the master when the own device is not set as the master.

Advantageous Effects of Invention

In the present invention, one of the plurality of audio devices serves as a master to distribute the audio channels to be processed among those audio devices including the own device, and determine an output delay time for each of the audio devices, and thus a multi-channel digital audio signal is processed through cooperation of the plurality of audio devices. Therefore, the multi-channel digital audio signal can be listened to at a channel count too high to be dealt with a single audio device, and a user can increase the channel count by adding to an audio device owned by the user, instead of replacing the owned audio device with a newly purchased audio device. According to the present invention, listening at a desired channel count is thus accomplished at a lower cost without wasting resources.

DESCRIPTION OF EMBODIMENTS

Now, one embodiment of the present invention is described with reference to the accompanying drawings.

Figure 1:
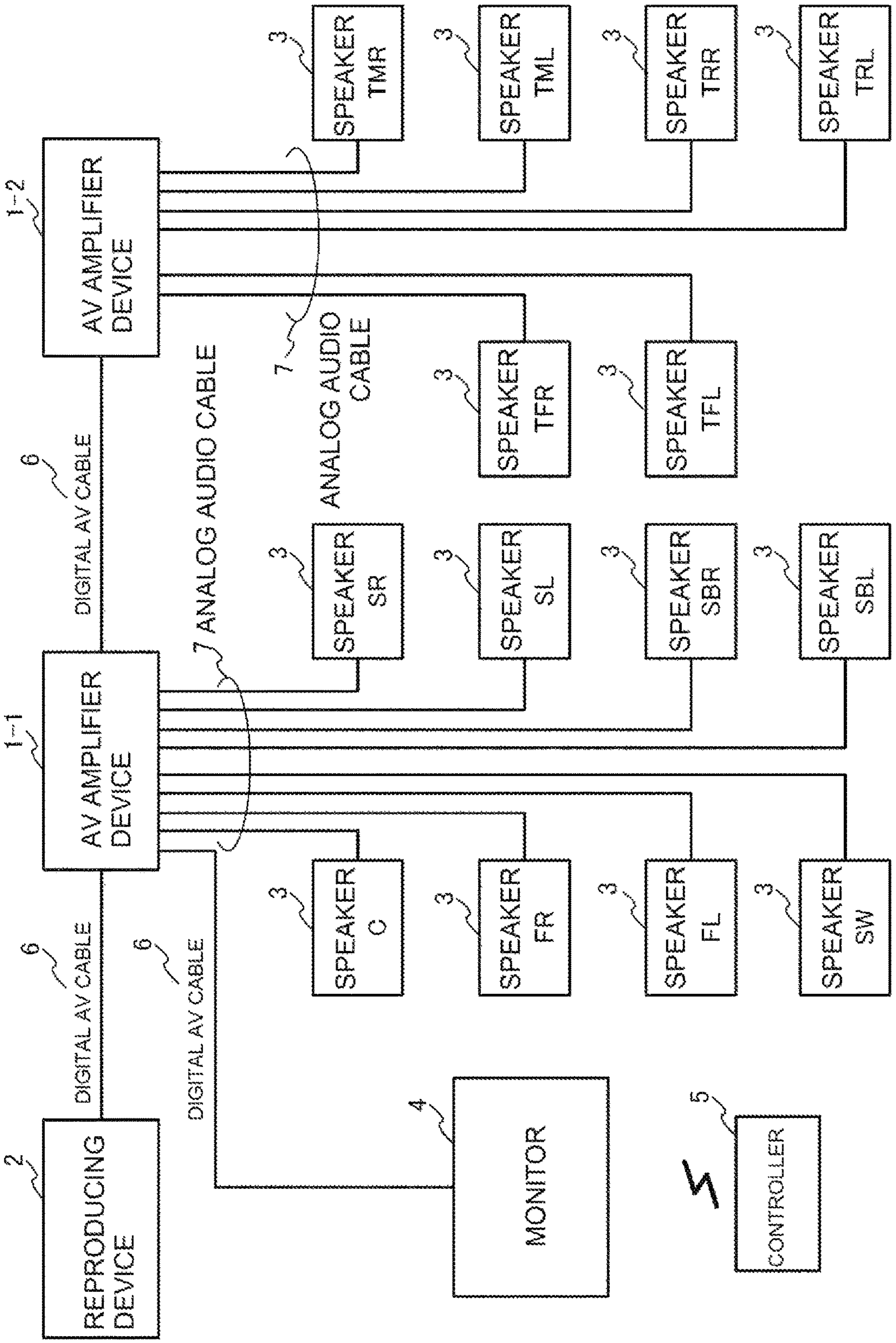
FIG. 1 is a schematic configuration diagram of an AV system according to one embodiment of the present invention.

FIG. 1 is a schematic configuration diagram of an audio visual (AV) system according to this embodiment.

As illustrated in the figure, the AV system according to this embodiment includes a plurality of AV amplifier devices 1-1 and 1-2 (hereinafter may simply be referred to as "AV amplifier devices 1"), a reproducing device 2, a plurality of speakers 3, a monitor 4, and a controller 5 for remotely operating the monitor 4.

The reproducing device 2, the AV amplifier devices 1, and the monitor 4 each include an HDMI (trademark). Digital AV cables 6 compatible with the HDMI (trademark) are used to connect between the reproducing device 2 and the AV amplifier device 1-1, between the AV amplifier device 1-1 and the monitor 4, and between the AV amplifier device 1-1 and the AV amplifier device 1-2. Each of the plurality of speakers 3 is connected to one of the AV amplifier devices 1 via an analog audio cable 7.

The AV amplifier devices 1 reproduce a digital AV signal including a multi-channel digital audio signal and a multi-channel digital video signal in conformity to Auro-3D (trademark), Dolby Atoms (trademark) for Home, or a similar reproduction method. In this embodiment, the AV amplifier devices 1 are assumed to be adaptable to up to 7.1 channels (a front left channel FL, a front right channel FR, a center channel C, a surround left channel SL, a surround right channel SR, a surround back left channel SBL, a surround back right channel SBR, and a subwoofer channel SW).

The reproducing device 2 reproduces a digital AV signal supporting a plurality of channel counts, and outputs the digital AV signal as an HDMI (trademark) signal. In this embodiment, the digital AV signal is assumed to support a plurality of channel counts including a channel count of 7.1.6 channels (the front left channel FL, the front right channel FR, the center channel C, the surround left channel SL, the surround right channel SR, the surround back left channel SBL, the surround back right channel SBR, the subwoofer channel SW, a top front left channel TFL, a top front right channel TFR, a top middle left channel TML, a top middle right channel TMR, a top rear left channel TRL, and a top rear right channel TRR).

The speakers 3 are provided so as to correspond, on a one-to-one basis, to the audio channels counted in a channel count of the AV system, and each output an audio signal of the corresponding audio channel. In this embodiment, 7.1.6 channels are assumed to be the channel count.

In the AV system configured as described above, the AV amplifier devices 1-1 and 1-2 process, in cooperation with each other, the digital AV signal output from the reproducing device 2. One of the AV amplifier devices 1-1 and 1-2 serves as a master to distribute the audio channels to be processed between the AV amplifier devices 1-1 and 1-2. Here, out of the 7.1.6 channels, the front left channel FL, the front right channel FR, the center channel C, the surround left channel SL, the surround right channel SR, the surround back left channel SBL, the surround back right channel SBR, and the subwoofer channel SW are distributed to the AV amplifier device 1-1, and the rest of the channels, namely, the top front left channel TFL, the top front right channel TFR, the top middle left channel TML, the top middle right channel TMR, the top rear left channel TRL, and the top rear right channel TRR, are distributed to the AV amplifier device 1-2. The master also determines an output delay time for each of the AV amplifier devices 1-1 and 1-2, based on a signal processing time of the monitor 4 (a time required to create display data by decoding from the digital video signal included in the digital AV signal) and a signal processing time of each of the AV amplifier devices 1-1 and 1-2 (a time required to create an analog audio signal by decoding from the digital audio signal included in the digital AV signal) so that timing of outputting the analog audio signal from each of the AV amplifier devices 1-1 and 1-2 is in synchronization with video output from the monitor 4 (Auto Lip-Sync). The master then sets the determined output delay time to each of the AV amplifier devices 1-1 and 1-2.

Only one AV amplifier device that satisfies a predetermined condition is selected to be the master out of the plurality of AV amplifier devices 1. In this embodiment, it is assumed that the AV amplifier device 1-1 connected to the monitor 4 is selected to be the master.

The AV amplifier device 1-1 relays the digital AV signal output from the reproducing device 2 to the monitor 4 and the AV amplifier device 1-2. The AV amplifier device 1-1 also decodes the multi-channel digital audio signal included in the digital AV signal output from the reproducing device 2 into analog audio signals of the front left channel FL, the front right channel FR, the center channel C, the surround left channel SL, the surround right channel SR, the surround back left channel SBL, the surround back right channel SBR, and the subwoofer channel SW distributed to the own device 1-1, and amplifies the analog audio signals. The AV amplifier device 1-1 delays the analog audio signals of the audio channels by the output delay time set to the own device 1-1, and then outputs the analog audio signals to the corresponding speakers 3 for the audio channels.

The AV amplifier device 1-2 decodes the digital AV signal output from the AV amplifier device 1-1 into analog audio signals of the top front left channel TFL, the top front right channel TFR, the top middle left channel TML, the top middle right channel TMR, the top rear left channel TRL, and the top rear right channel TRR distributed to the own device 1-2, and amplifies the analog audio signals. The AV amplifier device 1-2 delays the analog audio signals of the audio channels by the output delay time set to the own device 1-2, and then outputs the analog audio signals to the corresponding speakers 3 for the audio channels.

Figure 2:
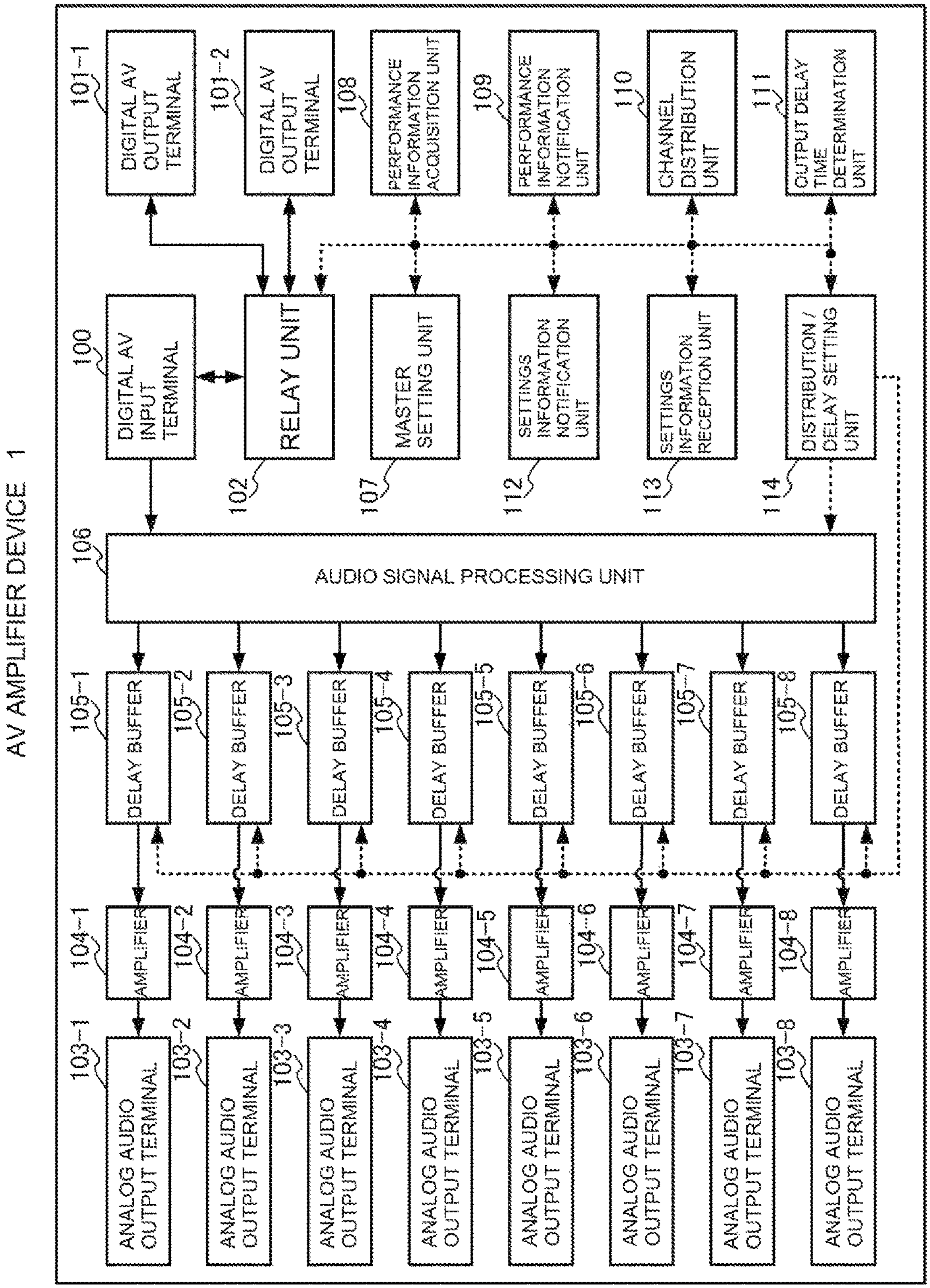
FIG. 2 is a schematic function configuration diagram of each of AV amplifier devices (1).

FIG. 2 is a schematic function configuration diagram of each of the AV amplifier devices 1.

As illustrated in the figure, the AV amplifier devices 1 each include a digital AV input terminal 100, a plurality of digital AV output terminals 101-1 and 101-2 (hereinafter may simply be referred to as "digital AV output terminals 101"), a relay unit 102, a plurality of analog audio output terminals 103-1 to 103-8 (hereinafter may simply be referred to as "analog audio output terminals 103"), a plurality of amplifiers 104-1 to 104-8 (hereinafter may simply be referred to as "amplifiers 104"), a plurality of delay buffers 105-1 to 105-8 (hereinafter may simply be referred to as "delay buffers 105"), an audio signal processing unit 106, a master setting unit 107, a performance information acquisition unit 108, a performance information notification unit 109, a channel distribution unit 110, an output delay time determination unit 111, a settings information notification unit 112, a settings information reception unit 113, and a distribution/delay setting unit 114.

The digital AV input terminal 100 is connected to the reproducing device 2 or another of the AV amplifier devices 1 via one of the digital AV cables 6, and a digital AV signal is input thereto.

The digital AV output terminal 101 is connected to the monitor 4 or another of the AV amplifier devices 1 via one of the digital AV cables 6, and a digital AV signal is output therefrom.

The relay unit 102 relays the digital AV signal input to the digital AV input terminal 100 to the digital AV output terminals 101. The relay unit 102 also relays a Consumer Electronics Control (CEC) command of the HDMI (trademark) that is input to the digital AV input terminal 100 to the digital AV output terminals 101, with information of its own device which is one of the AV amplifier devices 1 attached to the CEC command as relayer information, and relay a CEC command that is input to the digital AV output terminals 101 to the digital AV input terminal 100, with information of its own device which is one of the AV amplifier devices 1 attached to the CEC command as relayer information.

Each of the analog audio output terminals 103 is connected to one of the speakers 3 via the analog audio cable 7, and outputs an analog audio signal to the connected one of the speakers 3. In this embodiment, eight analog audio output terminals 103-1 to 103-8 are provided in order to be adaptable to up to 7.1 channels.

The amplifiers 104 are each provided for one of the analog audio output terminals 103, and each amplify an analog audio signal input thereto and output the amplified analog audio signal to the corresponding one of the analog audio output terminals 103.

The delay buffers 105 are each provided for one of the amplifiers 104, and each output an analog audio signal input thereto to the corresponding one of the amplifiers 104 after buffering the analog audio signal by a set output delay time.

The audio signal processing unit 106 decodes, for each audio channel distributed to its own device which is one of the AV amplifier devices 1, the multi-channel digital audio signal included in the digital AV signal input to the digital AV input terminal 100 into an analog audio signal of the corresponding audio channel. The audio signal processing unit 106 outputs this analog audio signal to one of the delay buffers 105 that is connected via one of the amplifiers 104 to one of the analog audio output terminals 103 that is allocated the corresponding audio channel.

The master setting unit 107 sets its own device which is one of the AV amplifier devices 1 as the sole master selected from the plurality of AV amplifier devices 1, when its own device 1 satisfies a predetermined condition. Otherwise, the master setting unit 107 sets its own device 1 as a slave. In this embodiment, the master setting unit 107 sets its own device which is one of the AV amplifier devices 1 as the master when the monitor 4 is connected to the digital AV output terminals 101 of its own device 1. Whether the monitor 4 is connected to the digital AV output terminals 101 can be checked by, for example, issuing an inquiry with the use of a CED command to a device connected via the digital AV cables 6 to the digital AV output terminals 101.

The performance information acquisition unit 108 acquires, when its own device which is one of the AV amplifier devices 1 is set as the master, performance information of the reproducing device 2 including an adaptable channel count (a maximum channel count supported by the multi-channel digital audio signal included in the digital AV signal) from the reproducing device 2 via the digital AV input terminal 100, and acquires performance information of another of the AV amplifier devices 1 including an adaptable channel count, a configuration of the analog audio output terminals 103, and a signal processing time from the another of the AV amplifier devices 1 via the digital AV input terminal 100 or via the digital AV output terminals 101. The performance information acquisition unit 108 also acquires performance information of the monitor 4 including a signal processing time from the monitor 4 via the digital AV output terminals 101. Those pieces of performance information can be acquired by issuing inquiries with the use of a CEC command to the reproducing device 2, the another of the AV amplifier devices 1, and the monitor 4.

The performance information notification unit 109 notifies, when its own device which is one of the AV amplifier devices 1 is set as a slave, performance information of its own device 1 including an adaptable channel count, a configuration of the analog audio output terminals 103, and a signal processing time to the master, in response to an inquiry about performance information received from the master via the digital AV input terminal 100 or the digital AV output terminals 101 and via the relay unit 102. The performance information can be notified to the master with the use of a CEC command.

The channel distribution unit 110 identifies, when its own device which is one of the AV amplifier devices 1 is set as the master, channel counts reachable through cooperation of the plurality of AV amplifiers 1-1 and 1-2, from among adaptable channel counts included in the performance information of the reproducing device 2 which is acquired by the performance information acquisition unit 108, based on the adaptable channel count of its own device 1 and the adaptable channel count included in the performance information of the another of the AV amplifier devices 1 which is acquired by the performance information acquisition unit 108. The channel distribution unit 110 further distributes an audio channel to be processed to each of the plurality of AV amplifier devices 1-1 and 1-2, based on a channel count selected by the user from among the identified channel counts.

The channel distribution unit 110 also determines which of the analog audio output terminals 103 is to be allocated for each audio channel to be processed that is distributed to its own device which is one of the AV amplifier devices 1, based on the configuration of the analog audio output terminals 103 of its own device 1, and determines, for each one of the other AV amplifier devices 1, which of the analog audio output terminals 103 is to be allocated for each audio channel to be processed that is distributed to the one of the other AV amplifier devices 1, based on the configuration of the analog audio output terminals 103 which is included in the performance information of the one of the other AV amplifier devices 1.

The channel distribution unit 110 also outputs connection guidance data for informing the user of which audio channels are distributed to which of the plurality of AV amplifier devices 1-1 and 1-2, to the monitor 4 via the relay unit 102 and the digital AV output terminals 101.

The output delay time determination unit 111 determines, when its own device which is one of the AV amplifier devices 1 is set as the master, an output delay time of each of the plurality of AV amplifier devices 1-1 and 1-2 so that timing of outputting an analog audio signal in the plurality of AV amplifier devices 1-1 and 1-2 is in synchronization with video output in the monitor 4, based on the signal processing time of its own device 1 and the signal processing times included in the performance information of the another of the AV amplifier devices 1 and the performance information of the monitor 4 which are acquired by the performance information acquisition unit 108.

The settings information notification unit 112 notifies, when its own device which is one of the AV amplifier devices 1 is set as the master, to the another of the AV amplifier devices 1 via the relay unit 102 and via the digital AV input terminal 100 or the digital AV output terminals 101, settings information including audio channels that are distributed to the another of the AV amplifier devices 1 by the channel distribution unit 110 and including the output delay time of the another of the AV amplifier devices 1 which is determined by the output delay time determination unit 111. The settings information can be notified to the another of the AV amplifier devices 1 with the use of a CEC command.

The settings information reception unit 113 receives, when its own device which is one of the AV amplifier devices 1 is set as a slave, the settings information from the master via the relay unit 102 and via the digital AV input terminal 100 or the digital AV output terminals 101.

The distribution/delay setting unit 114 sets, when its own device which is one of the AV amplifier devices 1 is set as the master, in the audio signal processing unit 106, audio channels distributed to its own device 1 by the channel distribution unit 110, and sets, when its own device which is one of the AV amplifier devices 1 is a slave, in the audio signal processing unit 106, audio channels that are distributed to its own device 1 and that are included in the settings information received from the master by the settings information reception unit 113.

The distribution/delay setting unit 114 also sets, when its own device which is one of the AV amplifier devices 1 is set as the master, in the delay buffers 105, the output delay time of its own device 1 determined by the output delay time determination unit 111, and sets, when its own device which is one of the AV amplifier devices 1 is a slave, in the delay buffers 105, the output delay time of its own device 1 that is included in the settings information received from the master by the settings information reception unit 113.

Next, operation of the AV amplifier devices 1 is described.

Setting operation of the AV amplifier devices 1 is described first.

Figure 3:
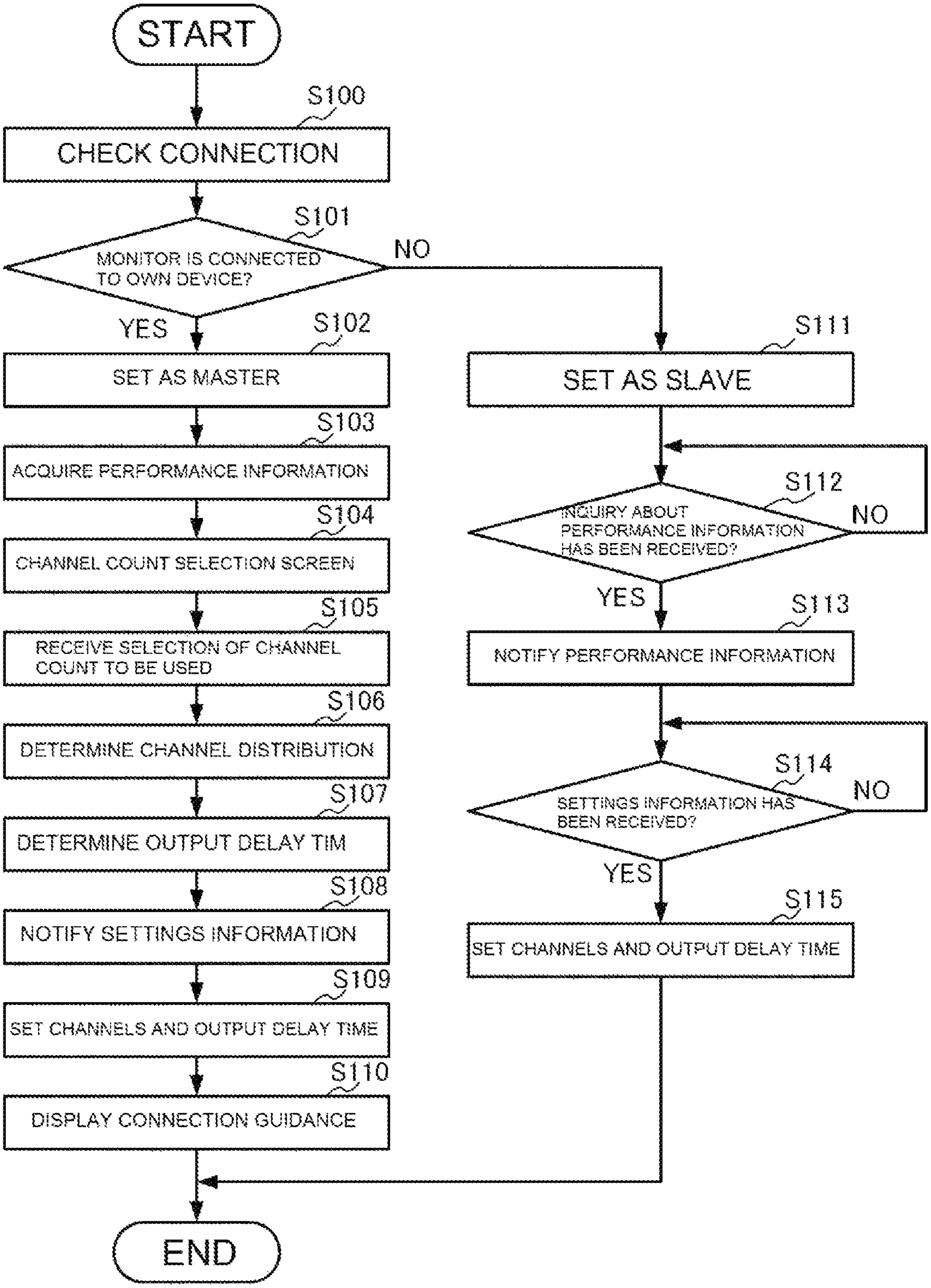
FIG. 3 is a flow chart for illustrating setting operation of the AV amplifier devices (1).

FIG. 3 is a diagram for illustrating the setting operation of the AV amplifier devices 1.

This flow is started upon reception of predetermined setting operation performed by the user, for example, pressing of a set button provided in each of the AV amplifier devices 1.

First, the master setting unit 107 determines, for each of the digital AV output terminals 101-1 and 101-2, whether a device is connected via one of the digital AV cables 6. When there is a device connected thereto, the master setting unit 107 transmits an inquiry to the connected device and receives a response therefrom to check whether the connected device is the monitor 4 (Step S100).

The master setting unit 107 next sets its own device which is one of the AV amplifier devices 1 as the master when the connected device is the monitor 4 ("YES" in Step S101) (Step S102). In response, the performance information acquisition unit 108 transmits inquiries about performance information from the digital AV input terminal 100 and the digital AV output terminals 101-1 and 101-2 via the relay unit 102, acquires the performance information of the reproducing device 2 including an adaptable channel count from the reproducing device 2, and the performance information of another of the AV amplifier devices 1 including the adaptable channel count, the configuration of the analog audio output terminals 103, and a signal processing time from the another of the AV amplifier devices 1, and acquires the performance information of the monitor 4 including a signal processing time from the monitor 4 (Step S103).

Next, the channel distribution unit 110 identifies channel counts reachable through cooperation of the plurality of AV amplifiers 1-1 and 1-2, from among adaptable channel counts included in the performance information of the reproducing device 2 which is acquired by the performance information acquisition unit 108, based on the adaptable channel count of its own device which is one of the AV amplifier devices 1 and the adaptable channel count included in the performance information of the another of the AV amplifier devices 1 which is acquired by the performance information acquisition unit 108. The channel distribution unit 110 then creates channel count selection screen data for displaying a list of the identified channel counts, and transmits the channel count selection screen data to one of the digital AV output terminals 101 to which the monitor 4 is connected via one of the digital AV cables 6 to display a channel count selection screen based on the channel count selection screen data on the monitor 4 (Step S104).

Figure 4:
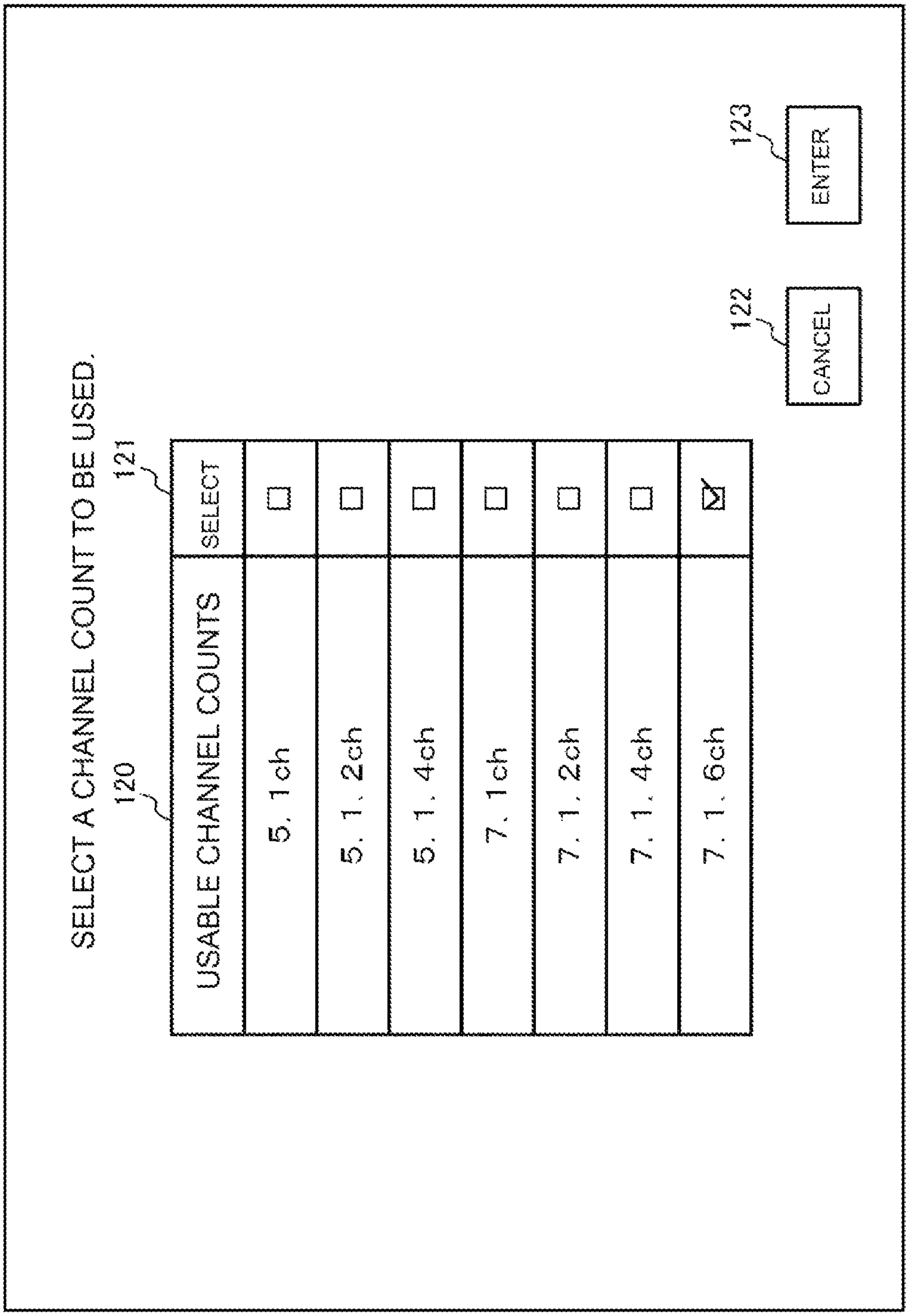
FIG. 4 is a diagram for illustrating a display example of a channel count selection screen.

FIG. 4 is a diagram for illustrating a display example of the channel count selection screen.

As illustrated in the figure, usable channel counts 120 are displayed in the form of a list on the channel count selection screen, along with checkboxes 121. A cancel button for unchecking the checkboxes 121 is denoted by a reference symbol 122. An enter button for confirming checking of one of the checkboxes 121 is denoted by a reference symbol 123. The user uses the controller 5 to check any one of the checkboxes 121 and select the enter button 123 with the checkbox checked. A usable channel count associated with the one of the checkboxes 121 that is checked is thus transmitted as a channel count selected to be used to the master from which the channel count selection screen data has been transmitted. An example in which a channel count of 7.1.6 channels is selected is illustrated in FIG. 4.

The channel distribution unit 110 next receives the selection of the channel count to be used from the monitor 4 via one of the digital AV output terminals 101 to which the monitor is connected and via the relay unit 102 (Step S105), and determines, for each of audio channels included in the channel count selected to be used, following a predetermined rule, to which of the plurality of AV amplifier devices 1-1 and 1-2 the audio channel is to be distributed (Step S106).

For example, priorities of AV amplifier devices 1 are determined in descending order of adaptable channel counts. Here, any order of priority is determined for a plurality of AV amplifier devices 1 that have the same adaptable channel count. Next, audio channels are distributed to the AV amplifier devices 1 in descending order of priority, with major (basic) audio channels distributed first. For example, when the channel count to be used is a channel count of X.Y.Z channels, the audio channels are distributed in the order of X, Y, and Z. In an example illustrated in FIG. 1, a channel count of 7.1.6 channels is selected as a channel count to be used, audio channels corresponding to a "7.1" part (the front left channel FL, the front right channel FR, the center channel C, the surround left channel SL, the surround right channel SR, the surround back left channel SBL, the surround back right channel SBR, and the subwoofer channel SW) of the 7.1.6 channels are distributed to the AV amplifier device 1-1, and audio channels corresponding to a "6" part (remaining audio channels: the top front left channel TFL, the top front right channel TFR, the top middle left channel TML, the top middle right channel TMR, the top rear left channel TRL, and the top rear right channel TRR) of the 7.1.6 channels are distributed to the AV amplifier device 1-2. The channel distribution unit 110 then allocates the analog audio output terminals 103-1 to 103-8 to the audio channels distributed to its own device which is one of the AV amplifier devices 1, based on the configuration of the analog audio output terminals 103 of its own device 1, and allocates, for each one of the other AV amplifier devices 1, the analog audio output terminals 103-1 to 103-8 to the audio channels distributed to the one of the other AV amplifier devices 1, based on the configuration of the analog audio output terminals 103 which is included in the performance information of the one of the other AV amplifier devices 1.

Next, the output delay time determination unit 111 determines an output delay time for each of the plurality of AV amplifier devices 1-1 and 1-2 so that timing of outputting an analog audio signal in the plurality of AV amplifier devices 1-1 and 1-2 is in synchronization with video output in the monitor 4, based on the signal processing time of its own device which is one of the AV amplifier devices 1, and the signal processing times included in the performance information of the another of the AV amplifier devices 1 and the performance information of the monitor 4 which are acquired by the performance information acquisition unit 108 (Step S107).

For example, when the signal processing times of the AV amplifier devices 1-1 and 1-2 are 50 ms and 70 ms, respectively, and the signal processing time of the monitor 4 is 100 ms, the output delay times of the AV amplifier devices 1-1 and 1-2 are determined to be 50 ms and 30 ms, respectively.

Next, the settings information notification unit 112 creates, for each one of the other AV amplifier devices 1, settings information including audio channels to be processed that are distributed to the one of the other AV amplifier devices 1 by the channel distribution unit 110, the analog audio output terminals 103 to which the audio channels to be processed are allocated, and the output delay time of the one of the other AV amplifier devices 1 which is determined by the output delay time determination unit 111, and notifies the created settings information to the one of the other AV amplifier devices 1 via the relay unit 102 and the digital AV input terminal 100 or via the digital AV output terminals 101 (Step S108).

Next, the distribution/delay setting unit 114 sets, in the audio signal processing unit 106, the audio channels distributed by the channel distribution unit 110 to its own device which is one of the AV amplifier devices 1, along with the analog audio output terminals 103 to which the audio channels are allocated. The distribution/delay setting unit 114 also sets, in the delay buffers 105, the output delay time of its own device 1 determined by the output delay time determination unit 111 (Step S109).

Next, the channel distribution unit 110 creates the connection guidance data for building an AV system at the channel count selected by the user to be used, and transmits the connection guidance data to the one of the digital AV output terminals 101 to which the monitor 4 is connected via one of the digital AV cables 6 to display connection guidance based on the connection guidance data on the monitor 4 (Step S110).

Figure 5:
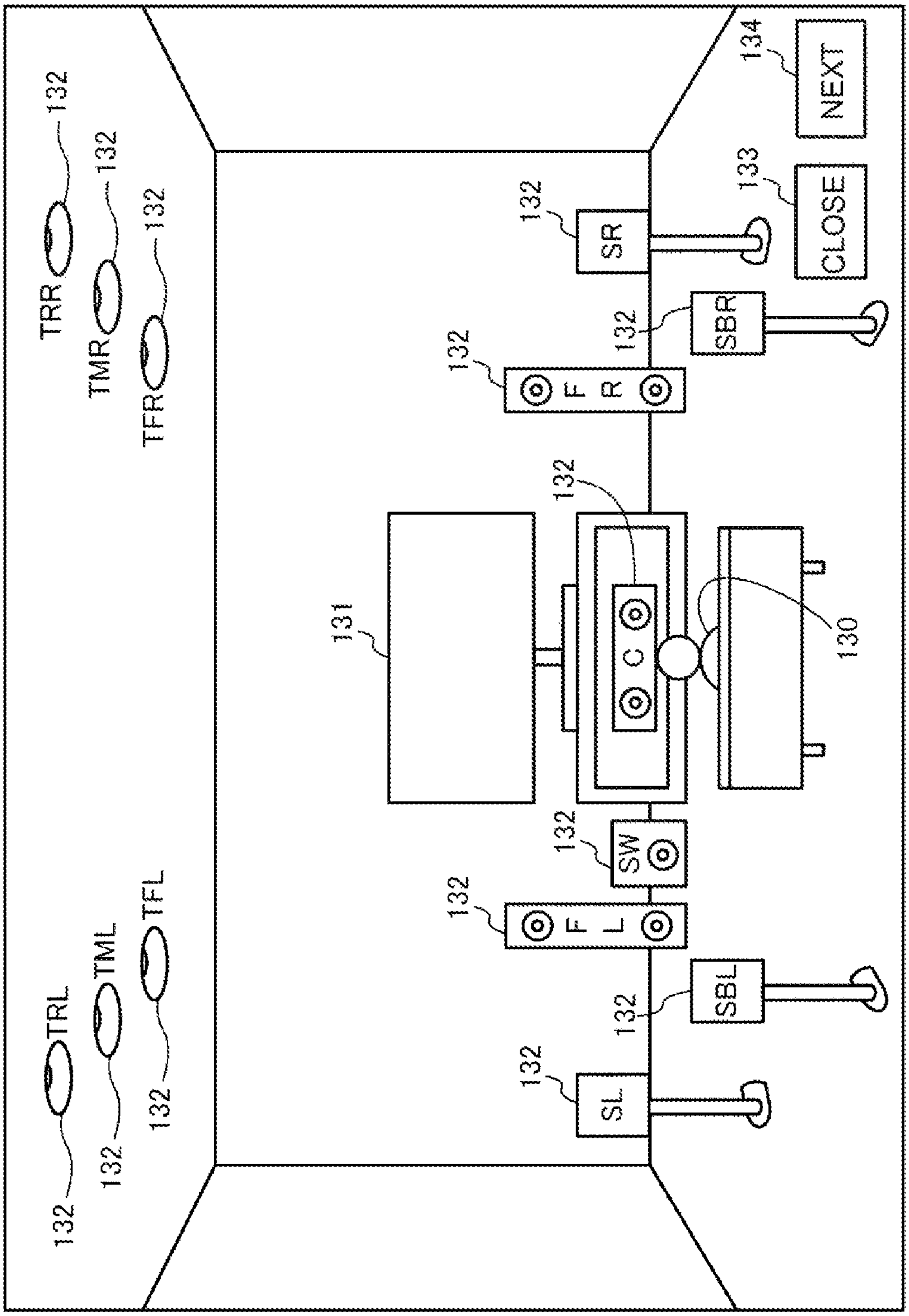
FIG. 5 is a diagram for illustrating a display example of a first screen of connection guidance.

FIG. 5 is a diagram for illustrating a display example of a first screen of the connection guidance.

As illustrated in the figure, the first screen of the connection guidance displays a recommended example of an arrangement position 131 of the monitor 4 and arrangement positions 132 of the speakers 3 for the audio channels included in the channel count to be used, in relation to a listening position 130 of the user. The recommended example illustrated in FIG. 5 is an example for a case in which the channel count to be used is a channel count of 7.1.6 channels. An end button for closing the first screen of the connection guidance that is being displayed is denoted by a reference symbol 133, and a switch button for switching the connection guidance from the first screen to a second screen described later is denoted by a reference symbol 134.

Figure 6:
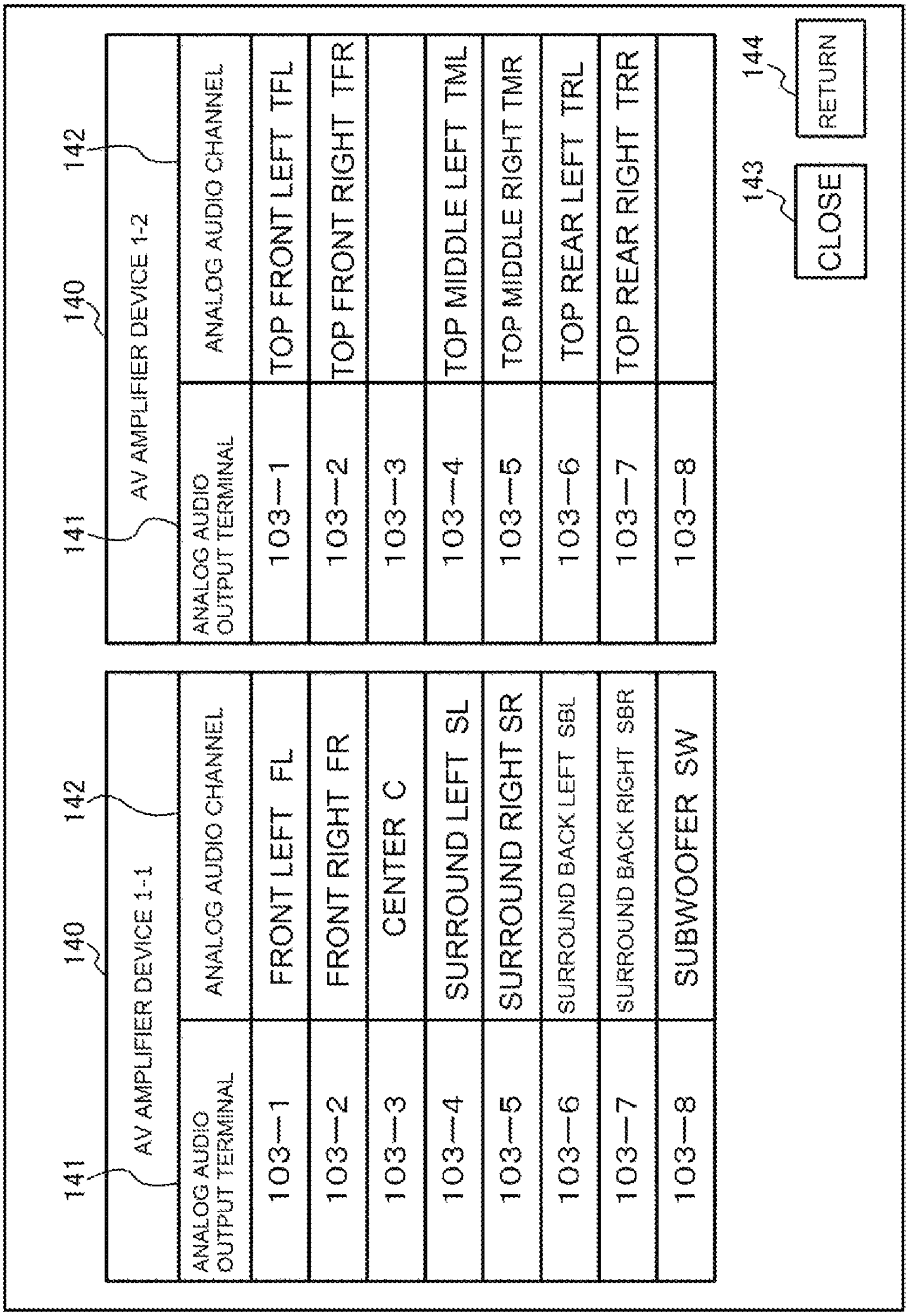
FIG. 6 is a diagram for illustrating a display example of a second screen of the connection guidance.

FIG. 6 is a diagram for illustrating a display example of the second screen of the connection guidance.

The second screen of the connection guidance is displayed when the user operates the controller 5 to select the switch button 134 on the first screen of the connection guidance illustrated in FIG. 5.

As illustrated in the figure, the second screen of the connection guidance displays, for each one of the AV amplifier devices 1, a table 140 showing connection relationships between the analog audio output terminals 103 and analog audio channels. A field for displaying identification information of the analog audio output terminal 103 is denoted by a reference symbol 141. A field for displaying an analog audio channel to be connected to one of the analog audio output terminals 103 that is displayed in the field 141 of the same row as that of the analog audio channel is denoted by a reference symbol 142. An end button for closing the second screen of the connection guidance that is being displayed is denoted by a reference symbol 143. A switch button for switching the connection guidance from the second screen to the first screen is denoted by a reference symbol 144. It is preferred that the table 140 display a product name, a serial number, and the like of the one of the AV amplifier devices 1. This facilitates grasping of an association relationship to the actual one of the AV amplifier devices 1. A product name, a serial number, and the like of another of the AV amplifier devices 1 may be included in the performance information so that those pieces of information are acquired from the another of the AV amplifier devices 1 along with adaptable channel counts, the configuration of the analog audio output terminals 103, and the signal processing time.

When it is found out in Step S101 that the connected device is not the monitor 4, or that no device is connected, in each of the digital AV output terminals 101-1 and 101-2 ("NO" in Step S101), on the other hand, the own device which is one of the AV amplifier devices 1 is set as a slave (Step S111).

In response, the performance information notification unit 109 waits for an inquiry about the performance information sent from the master via one of the digital AV input terminal 100 and the digital AV output terminals 101-1 and 101-2 and via the relay unit 102 (Step S112). When an inquiry about the performance information from the master has been received ("YES" in Step S112), the performance information notification unit 109 notifies the performance information including adaptable channel counts of its own device which is one of the AV amplifier devices 1, the configuration of the analog audio output terminals 103, and the signal processing time to the master (Step S113).

Next, the settings information reception unit 113 waits for the settings information sent from the master via one of the digital AV input terminal 100 and the digital AV output terminals 101-1 and 101-2 and via the relay unit 102 (Step S114). When the settings information has been received from the master ("YES" in Step S114), the settings information reception unit 113 notifies audio channels to be processed, the analog audio output terminals 103, and an output delay time that are included in the settings information to the distribution/delay setting unit 114. The notified audio channels are audio channels distributed to its own device which is one of the AV amplifier devices 1 to be processed, the notified analog audio output terminals 103 are the analog audio output terminals 103 to which the audio channels to be processed are allocated, and the notified output delay time is the output delay time of its own device 1.

In response, the distribution/delay setting unit 114 sets, in the audio signal processing unit 106, the audio channels to be processed that are notified from the settings information reception unit 113, along with the analog audio output terminals 103 to which the audio channels are allocated. The distribution/delay setting unit 114 also sets, in the delay buffers 105, the output delay time notified from the settings information reception unit 113 (Step S115).

Operation of digital AV signal processing of the AV amplifier devices 1 is described next.

In FIG. 2, the digital AV input terminal 100 outputs a digital AV signal input thereto to the relay unit 102 and the audio signal processing unit 106.

In response, the relay unit 102 outputs the digital AV signal from the digital AV output terminal 101-1 when a device is connected to the digital AV output terminal 101-1 via one of the digital AV cables 6. Similarly, the relay unit 102 outputs the digital AV signal from the digital AV output terminal 101-2 when a device is connected to the digital AV output terminal 101-2 via one of the digital AV cables 6.

The audio signal processing unit 106 decodes, for each audio channel set by the distribution/delay setting unit 114, a multi-channel digital audio signal included in the digital AV signal into an analog audio signal of the corresponding audio channel. The audio signal processing unit 106 outputs this analog audio signal to one of the delay buffers 105 that is connected via one of the amplifiers 104 to one of the analog audio output terminals 103 to which the corresponding audio channel is allocated.

When the analog audio signal is input, the one of the delay buffers 105 buffers this analog audio signal by the output delay time set by the distribution/delay setting unit 114, and then outputs the analog audio signal to the corresponding one of the amplifiers 104. When the analog audio signal is input, the one of the amplifiers 104 amplifies this analog audio signal and outputs the analog audio signal to the corresponding one of the analog audio output terminals 103.

One embodiment of the present invention is described above.

In this embodiment, one of the plurality of AV amplifier devices 1 serves as a master to distribute audio channels to be processed among those AV amplifier devices 1 including the one of the AV amplifier devices 1 that is the master, and determine an output delay time for each of the AV amplifier devices 1, and thus a digital AV signal including a multi-channel digital audio signal is processed through cooperation of the plurality of AV amplifier devices 1. Therefore, the multi-channel digital audio signal can be listened to at a channel count too high to be dealt with by one of the AV amplifier devices 1 by itself, and a user can increase the channel count by adding to the AV amplifier devices 1 owned by the user, instead of replacing the owned AV amplifier devices 1 with a newly purchased device. According to this embodiment, listening at a desired channel count is thus accomplished at a lower cost without wasting resources.

In this embodiment, the master identifies channel counts reachable through cooperation of the plurality of AV amplifier devices 1, from among channel counts supported by the multi-channel digital audio signal, based on the adaptable channel count of the one of the AV amplifier devices 1 that is the master and an adaptable channel count included in the performance information acquired from one of the AV amplifier devices 1 that is not the master, and distributes audio channels included in a channel count selected by a user from the identified channel counts among the plurality of AV amplifier devices 1. The user can accordingly build an AV system by selecting a desired channel count from channel counts reachable through cooperation of the plurality of AV amplifier devices 1.

In this embodiment, the master distributes the audio channels to be processed to the AV amplifier devices 1 in descending order of adaptable channel counts of the AV amplifier devices 1. The AV amplifier devices 1 adaptable to more channel counts are considered to be higher in quality and processing capability. Therefore, an AV system having a higher quality can be built by distributing audio channels to the AV amplifier devices 1 in descending order of adaptable channel counts of the AV amplifier devices 1 and distributing major audio channels first.

In this embodiment, the master outputs, to the monitor 4, the connection guidance data for informing the user about which audio channel is distributed to which of the plurality of AV amplifier devices 1. This enables the user to build an AV system by referring to the connection guidance displayed based on this connection guidance data, thus improving user-friendliness.

The present invention is not limited to the embodiment described above, and various modifications may be made thereto within the scope of the gist of the present invention.

For example, in the embodiment described above, the AV amplifier devices 1 each adjust timing of outputting, from one of the analog audio terminals 103, an analog audio signal that has been created through decoding by the audio signal processing unit 106, by outputting the analog audio signal to one of the delay buffers 105 and buffering the analog audio signal in the one of the delay buffers 105 by an output delay time set by the distribution/delay setting unit 114. However, the present invention is not limited thereto. The timing of outputting the analog audio signal from one of the analog audio terminals 103 may be adjusted by using the audio signal processing unit 106 to delay, based on an output delay time set by the distribution/delay setting unit 114, processing of creating an analog audio signal through decoding. In this case, the delay buffers 105 can be omitted.

In the embodiment described above, the plurality of AV amplifier devices 1-1 and 1-2 are connected in series, with the reproducing device 2 as a starting point, but the present invention is not limited thereto. For example, the plurality of AV amplifier devices 1-1 and 1-2 may be connected in parallel via a reproducing device 2A as in a first modification example of the present invention illustrated in FIG. 7. As another example, the plurality of AV amplifier devices 1-1 and 1-2 may be connected in parallel via a distribution device 8 which is connected to the reproducing device 2 and which distributes a digital AV signal output from the reproducing device 2 to a plurality of components as in a second modification example of the present invention illustrated in FIG. 8.

Figure 7:
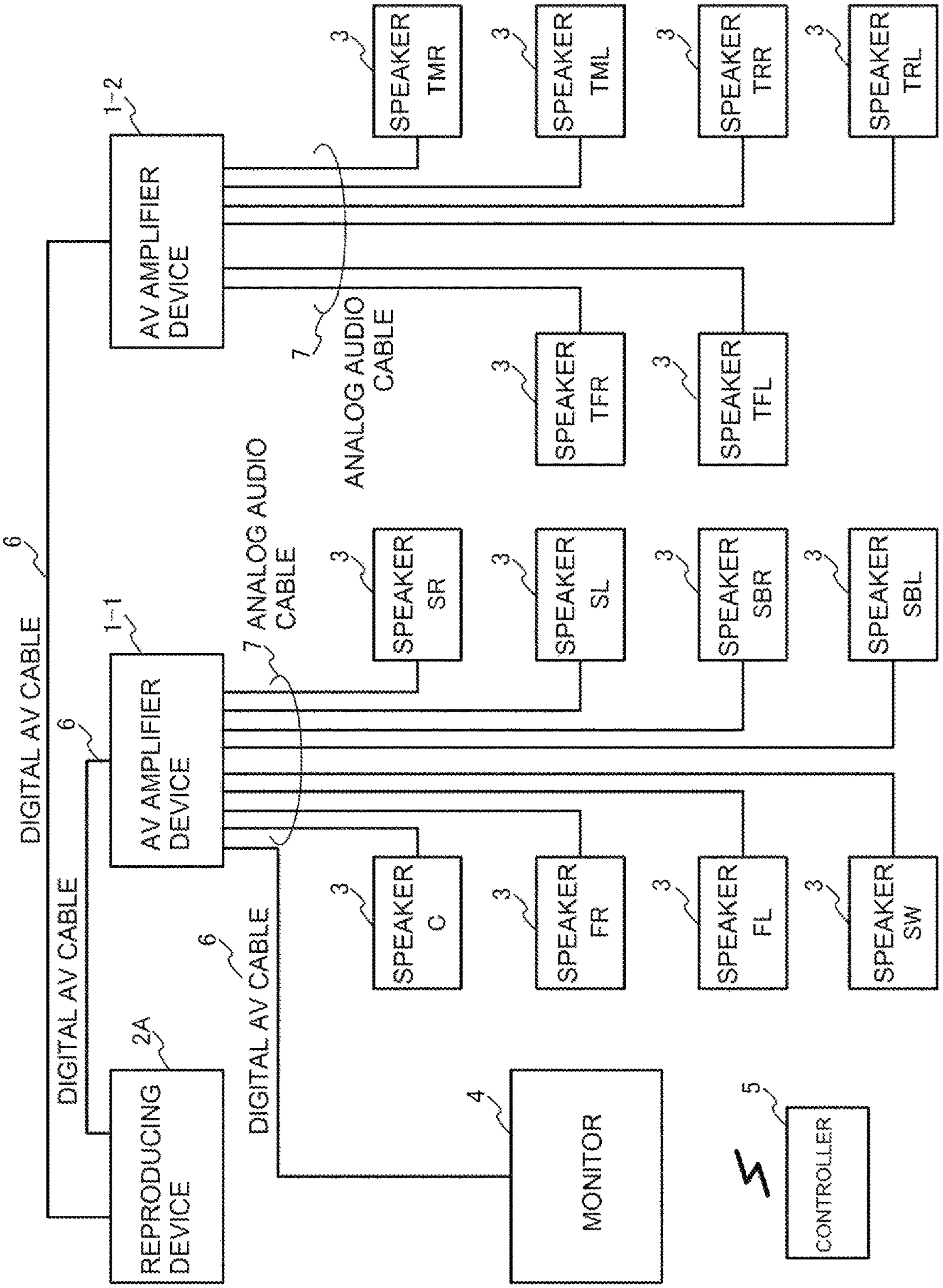
FIG. 7 is a schematic configuration diagram of a first modification example of the AV system illustrated in FIG. 1.
Figure 8:
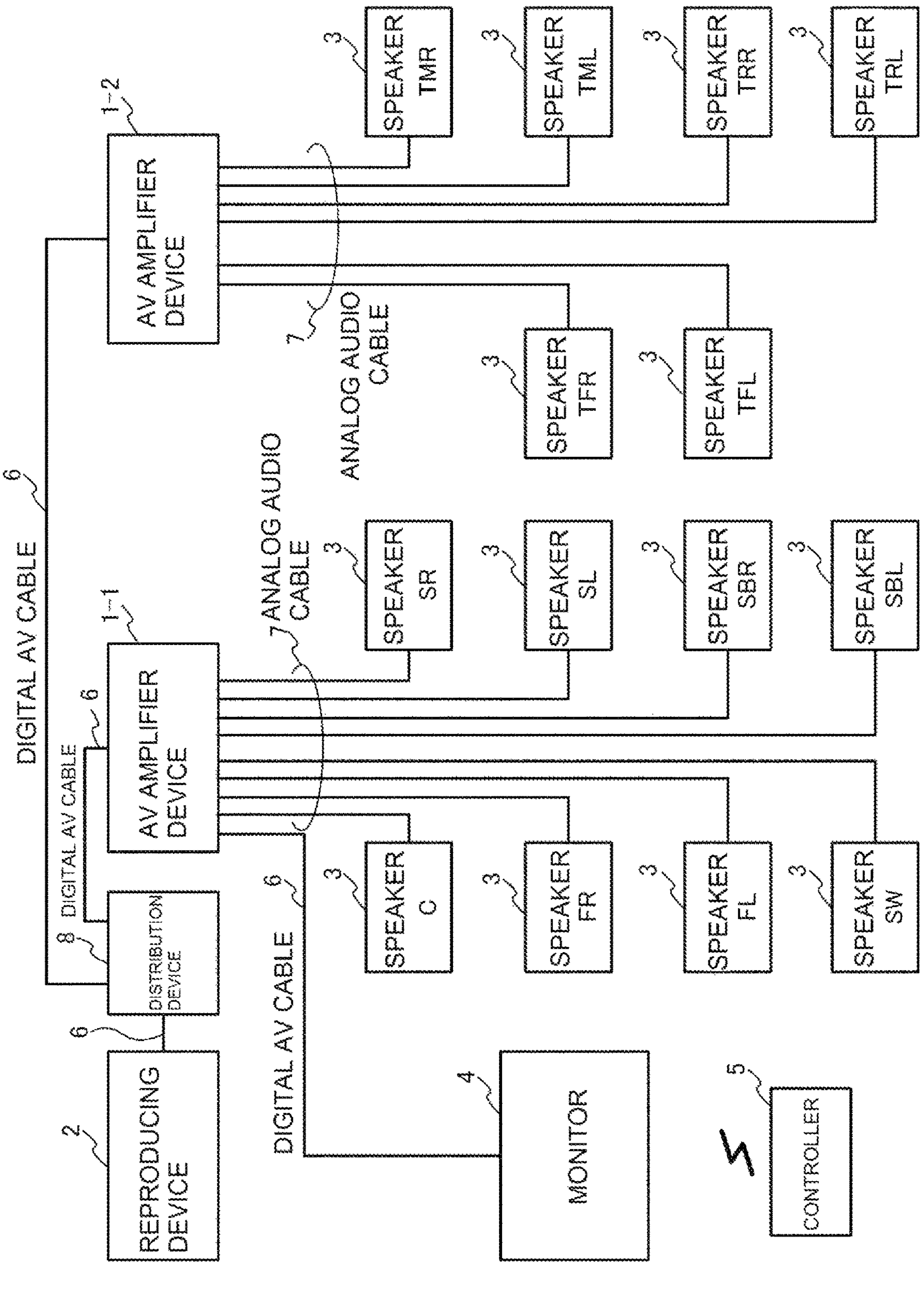
FIG. 8 is a schematic configuration diagram of a second modification example of the AV system illustrated in FIG. 1.

In the first modification example illustrated in FIG. 7, the reproducing device 2A has a function of issuing an inquiry about the performance information and a function of relaying the performance information, the settings information, and the like between the AV amplifier devices 1-1 and 1-2. In the second modification example illustrated in FIG. 8, the distribution device 8 has a function of issuing an inquiry about the performance information and a function of relaying the performance information, the settings information, and the like between the AV amplifier devices 1-1 and 1-2.

In the embodiment described above, two AV amplifier devices 1-1 and 1-2 are connected in series, but three or more AV amplifier devices 1 may be connected in series. Similarly, in the first modification example illustrated in FIG. 7 and the second modification example illustrated in FIG. 8, two AV amplifier devices 1-1 and 1-2 are connected in parallel, but three or more AV amplifier devices 1 may be connected in parallel.

In the embodiment described above, the AV amplifier device 1-1 connected to the monitor 4 via one of the digital AV cables 6 is set as the sole master selected from among the plurality of AV amplifier devices 1. However, the present invention is not thereto. One of the AV amplifier devices 1 may be selected under a different condition to be set as the master as long as only one AV amplifier device can be selected from among the plurality of AV amplifier devices 1. For example, the plurality of AV amplifier devices 1 may be switched with one another based on their manufacturing years to set one of the AV amplifier devices 1 that has the latest manufacturing year as the master.

The embodiment described above is premised on the use of a CEC command of the HDMI (trademark) in transmission and reception of an inquiry about the performance information, the performance information, the settings information, and the like between the plurality of AV amplifier devices 1-1 and 1-2. However, the present invention is not limited thereto. A control command having a unique format may be used to transmit and receive an inquiry about the performance information, the performance information, the settings information, and the like between the plurality of AV amplifier devices 1-1 and 1-2.

In the embodiment described above, HDMI (trademark) interfaces are used as connection interfaces between the AV amplifier devices 1 and the reproducing device 2, between the AV amplifier devices 1 and the monitor 4, and between one of the AV amplifier devices 1 and another of the AV amplifier devices 1. However, the present invention is not limited thereto. For example, a universal serial bus (USB) interface or any other connection interface may be used as long as a digital AV signal and a control command including an inquiry about the performance information, the performance information, the settings information, and the like can be transmitted and received through the interface.

Further, in the embodiment described above, the functional configuration of each of the AV amplifier devices 1 illustrated in FIG. 2 may be implemented by hardware through use of an integrated logic IC, for example, an application specific integrated circuit (ASIC) or a field programmable gate array (FPGA), or may be implemented by software through use of a computer, for example, a digital signal processor (DSP). Alternatively, the functional configuration may be implemented by a general computer, for example, a personal computer including a central processing unit (CPU), a memory, a flash memory, a hard disk drive or another such auxiliary storage device, a wireless LAN adaptor or another such communication device, a speaker, and a microphone, causing the CPU to load a predetermined program into the memory from the auxiliary storage device and execute the program.

The embodiment described above takes as an example the plurality of AV amplifier devices 1 for processing a digital AV signal including a multi-channel digital audio signal and a multi-channel digital video signal in cooperation with one another, and an AV system including the plurality of AV amplifier devices 1. However, the present invention is not limited thereto. The present invention is applicable to a wide range of audio devices for processing a multi-channel digital audio signal through cooperation of a plurality of audio devices, and a wide range of audio systems each including a plurality of such audio devices.

In this case, one of the plurality of audio devices serves as a master to distribute audio channels to be processed among those audio devices including the own device, and determine, based on a signal processing time of each of the audio devices, an output delay time of each of the audio devices so that timing of outputting an analog audio signal matches for all of the audio devices. Each of the audio devices decodes the multi-channel digital audio signal input thereto into an analog audio signal for the audio channel distributed by the master to the own device, and outputs the analog audio signal created by the decoding with a delay of the output delay time determined by the master for the own device.

REFERENCE SIGNS LIST

1, 1-1, 1-2: AV amplifier device, 2, 2A: reproducing device, 3: speaker, 4: monitor, 5: controller, 6: digital AV cable, 7: analog audio cable, 8: distribution device, 100: digital AV input terminal, 101-1, 101-2: digital AV output terminal, 102: relay unit, 103-1 to 103-8: analog audio output terminal, 104-1 to 104-8: amplifier, 105-1 to 105-8: delay buffer, 106: audio signal processing unit, 107: master setting unit, 108: performance information acquisition unit, 109: performance information notification unit, 110: channel distribution unit, 111: output delay time determination unit, 112: settings information notification unit, 113: settings information reception unit, 114: distribution/delay setting unit

The invention claimed is:

1. An audio device for processing a multi-channel digital audio signal through cooperation with another audio device, comprising:

master setting means configured to set, when an own device satisfies a predetermined condition, the own device as a sole master selected from among a plurality of audio devices including the own device and the another audio device;

performance information acquisition means configured to acquire, when the own device is set as the master by the master setting means, from the another audio device, performance information including an adaptable channel count and a signal processing time;

channel distribution means configured to distribute, when the own device is set as the master by the master setting means, an audio channel to be processed to each of the plurality of audio devices, based on an adaptable channel count of the own device and the adaptable channel count that is included in the performance information acquired from the another audio device by the performance information acquisition means;

output delay time determination means configured to determine, when the own device is set as the master by the master setting means, an output delay time for each of the plurality of audio devices so that timing of outputting an analog audio signal matches in the plurality of audio devices, based on the signal processing time in the own device and the signal processing time that is included in the performance information acquired from the another audio device by the performance information acquisition means;

settings information notification means configured to notify to the another audio device, when the own device is set as the master by the master setting means, settings information including the audio channel to be processed that is distributed to the another audio device by the channel distribution means and the output delay time determined for the another audio device by the output delay time determination means;

audio signal processing means configured to decode the multi-channel digital audio signal input thereto into the analog audio signal for the audio channel distributed to the own device by the channel distribution means when the own device is set as the master by the master setting means, and to decode the multi-channel digital audio signal input thereto into an analog audio signal for the audio channel that is included in the settings information notified from the master when the own device is not set as the master; and audio output delay means configured to output the analog audio signal created through decoding by the audio signal processing means with a delay of the output delay time determined for the own device by the output delay time determination means when the own device is set as the master by the master setting means, and to output the analog audio signal created through decoding by the audio signal processing means with a delay of the output delay time that is included in the settings information notified from the master when the own device is not set as the master, wherein the channel distribution means is further configured to:

identify channel counts reachable through cooperation of the plurality of audio devices including the own device from among channel counts supported by the multi-channel digital audio signal, based on the adaptable channel count of the own device and the adaptable channel count that is included in the performance information acquired by the performance information acquisition means from each of the audio devices other than the own device, distribute audio channels included in a channel count selected by a user from among the identified channel counts to the plurality of audio devices including the own device, distribute the audio channels to be processed to the plurality of audio devices in descending order of the adaptable channel counts of the plurality of audio devices, wherein major or basic audio channels are to be distributed first, and output, to a display device, connection guidance data for informing a user about which audio channel is distributed to which of the plurality of audio devices including the own device.

2. The audio device according to claim 1, wherein the master setting means is configured to set the own device as the master when a display device is connected to the own device.

3. The audio device according to claim 1, wherein the audio device is an audio visual device configured to process a digital audio visual signal including a multi-channel digital audio signal and a multi-channel digital video signal, through cooperation of a plurality of audio visual devices, and is configured to output, when a display device is connected to the own device, the digital audio visual signal input thereto to the display device, wherein the performance information acquisition means is configured to acquire, when the own device is set as the master by the master setting means, performance information including a signal processing time from the display device, and wherein the output delay time determination means is configured to determine an output delay time for each of the plurality of audio devices including the own device so that timing of outputting an analog audio signal in the plurality of audio devices including the own device is in synchronization with video output in the display device, based on the signal processing time in the own device and the signal processing times included in pieces of performance information acquired from the audio devices other than the own device and from the display device by the performance information acquisition means.

4. An audio system for processing a multi-channel digital audio signal, comprising the plurality of audio devices of claim 1 which are connected in series with a reproducing device as a starting point, wherein each of the plurality of audio devices includes:

input means to which a multi-channel digital audio signal output from the reproducing device or from another of the plurality of audio devices is to be input; and output means configured to output the multi-channel digital audio signal input to the input means to the another of the plurality of audio devices.

5. The audio system according to claim 4, wherein a plurality of cables connect the plurality of audio devices and the reproducing device connected in series, wherein each cable of the plurality of cables comprises an HDMI cable or an HDMI-compatible cable.

6. An audio system for processing a multi-channel digital audio signal, comprising the plurality of audio devices of claim 1 which are connected in parallel via a reproducing device, or via a distribution device which is connected to the reproducing device and which is configured to distribute a multi-channel digital audio signal output from the reproducing device to a plurality of components, wherein each of the plurality of audio devices include input means to which the multi-channel digital audio signal output from the reproducing device or the distribution device is to be input.

7. The audio system according to claim 6, wherein a plurality of cables connect the plurality of audio devices connected in parallel via the reproducing device, or via the distribution device connected to the reproducing device, wherein each cable of the plurality of cables comprises an HDMI cable or an HDMI-compatible cable.

8. The audio device according to claim 1, wherein the own device and the another audio device are configured to connect to each other via a cable comprising an HDMI cable or an HDMI-compatible cable.

9. The audio device according to claim 8, comprising:

a relay unit configured to relay a Consumer Electronics Control (CEC) command of HDMI, which is input to a digital terminal of the audio device, with information of the own device.

10. The audio device according to claim 9, wherein the channel distribution means is configured to receive a selection of the channel count selected by the user from the display device via a digital terminal to which the display device is connected and via the relay unit.

11. The audio device according to claim 8, wherein the performance information acquired by the performance information acquisition means is acquired via one or more inquiries issued with the use of a CEC command of HDMI.

12. The audio device according to claim 1, wherein the audio channels are to be distributed in the order of X, Y, and Z when the channel count selected by the user is a channel count of X.Y.Z channels.

13. The audio device according to claim 1, wherein a screen of connection guidance, based on the connection guidance data, displays one or more arrangement positions of respective one or more speakers for the audio channels included in the channel count selected by the user.

14. The audio device according to claim 13, wherein the screen of the connection guidance displays the one or more arrangement positions of respective one or more speakers for the audio channels included in the channel count selected by the user, in relation to a listening position of the user.

15. The audio device according to claim 1, wherein a screen of connection guidance, based on the connection guidance data, displays an arrangement position of the display device and one or more arrangement positions of respective one or more speakers for the audio channels included in the channel count selected by the user.

16. The audio device according to claim 15, wherein the screen of the connection guidance displays the arrangement position of the display device and the one or more arrangement positions of respective one or more speakers for the audio channels included in the channel count selected by the user, in relation to a listening position of the user.

17. The audio device according to claim 1, wherein a screen of the connection guidance, based on the connection guidance data, displays, for at least one audio device of the plurality of audio devices, a table showing one or more connection relationships between one or more analog audio output terminals and one or more analog audio channels.

18. A non-transitory computer-readable storage medium storing a program readable by a computer, the program including instructions that, when executed by one or more processors of the computer, cause the computer to function as an audio device for processing a multi-channel digital audio signal through cooperation with another audio device, the audio device including:

master setting means configured to set, when an own device satisfies a predetermined condition, the own device as a sole master selected from among a plurality of audio devices including the own device and the another audio device;

performance information acquisition means configured to acquire, when the own device is set as the master by the master setting means, from the another audio device, performance information including an adaptable channel count and a signal processing time;

channel distribution means configured to distribute, when the own device is set as the master by the master setting means, an audio channel to be processed to each of the plurality of audio devices, based on an adaptable channel count of the own device and the adaptable channel count that is included in the performance information acquired from the another audio device by the performance information acquisition means;

output delay time determination means configured to determine, when the own device is set as the master by the master setting means, an output delay time for each of the plurality of audio devices so that timing of outputting an analog audio signal matches in the plurality of audio devices, based on the signal processing time in the own device and the signal processing time that is included in the performance information acquired from the another audio device by the performance information acquisition means;

settings information notification means configured to notify, when the own device is set as the master by the master setting means, settings information including the audio channel to be processed that is distributed to the another audio device by the channel distribution means and the output delay time determined for the another audio device by the output delay time determination means;

audio signal processing means configured to decode the multi-channel digital audio signal input thereto into the analog audio signal for the audio channel distributed to the own device by the channel distribution means when the own device is set as the master by the master setting means, and to decode the multi-channel digital audio signal input thereto into an analog audio signal for the audio channel that is included in the settings information notified from the master when the own device is not set as the master; and audio output delay means configured to output the analog audio signal created through decoding by the audio signal processing means with a delay of the output delay time determined for the own device by the output delay time determination means when the own device is set as the master by the master setting means, and to output the analog audio signal created through decoding by the audio signal processing means with a delay of the output delay time that is included in the settings information notified from the master when the own device is not set as the master, wherein the channel distribution means is further configured to:

identify channel counts reachable through cooperation of the plurality of audio devices including the own device from among channel counts supported by the multi-channel digital audio signal, based on the adaptable channel count of the own device and the adaptable channel count that is included in the performance information acquired by the performance information acquisition means from each of the audio devices other than the own device, distribute audio channels included in a channel count selected by a user from among the identified channel counts to the plurality of audio devices including the own device, distribute the audio channels to be processed to the plurality of audio devices in descending order of the adaptable channel counts of the plurality of audio devices, wherein major or basic audio channels are to be distributed first, and output, to a display device, connection guidance data for informing a user about which audio channel is distributed to which of the plurality of audio devices including the own device.

19. The non-transitory computer-readable storage medium according to claim 18, wherein the performance information acquired by the performance information acquisition means is acquired via one or more inquiries issued with the use of a CEC command of HDMI.

20. The non-transitory computer-readable storage medium according to claim 18, wherein a screen of connection guidance, based on the connection guidance data, displays an arrangement position of the display device and one or more arrangement positions of respective one or more speakers for the audio channels included in the channel count selected by the user, in relation to a listening position of the user.

* * * * *